(12) United States Patent
Pan et al.

(10) Patent No.: US 9,495,389 B2
(45) Date of Patent: Nov. 15, 2016

(54) CLIENT-SERVER BASED DYNAMIC SEARCH

(71) Applicant: QUALCOMM Incorporated, San Diego, CA (US)

(72) Inventors: Qi Pan, Vienna (AT); Daniel Wagner, Vienna (AT); Zsolt Szalavari, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 13/843,607

(22) Filed: Mar. 15, 2013

(65) Prior Publication Data

US 2014/0279860 A1    Sep. 18, 2014

(51) Int. Cl.
*G06F 17/30* (2006.01)
*G06F 7/00* (2006.01)

(52) U.S. Cl.
CPC ..... *G06F 17/30277* (2013.01); *G06F 17/3087* (2013.01)

(58) Field of Classification Search
USPC ........................................................ 707/609
See application file for complete search history.

(56) References Cited

U.S. PATENT DOCUMENTS

| | | | | |
|---|---|---|---|---|
| 5,848,201 A | * | 12/1998 | Kajiwara | G06T 1/20 345/644 |
| 6,801,210 B2 | * | 10/2004 | Yomdin | H04B 1/52 345/581 |
| 8,022,812 B2 | * | 9/2011 | Beniyama | G05D 1/024 235/375 |
| 8,180,486 B2 | * | 5/2012 | Saito | G01S 5/0252 700/245 |
| 8,249,302 B2 | * | 8/2012 | Ramalingam | G01C 21/3602 340/995.28 |

(Continued)

FOREIGN PATENT DOCUMENTS

WO     2012049674 A2    4/2012

OTHER PUBLICATIONS

Chekhlov D., et al., "Ninja on a Plane", Mixed and Augmented Reality, 2007, ISMAR, 2007, 6th IEEE and ACM International Symposium on, Nov. 13, 2007 (Nov. 13, 2007),-Nov. 16, 2007 (Nov. 16, 2007), XP058033272, DOI: 10.1109/ISMAR.2007.4538840, ISBN: 978-1-4244-1749-0, pp. 1-4.

(Continued)

*Primary Examiner* — Kuen Lu
(74) *Attorney, Agent, or Firm* — Silicon Valley Patent Group LLP (57) ABSTRACT

Method, mobile device, computer program product and apparatus for performing a search are disclosed. The method of performing a search comprises receiving one or more images of an environment in view of a mobile device, generating a simultaneous localization and mapping of the environment using the one or more images, wherein the simultaneous localization and mapping of the environment comprises a plurality of map points representing a plurality of surfaces in a three dimensional coordinate system of the environment, sending a set of the plurality of map points as a search query to a server, receiving a query response from the server, and identifying an object in the environment based at least in part on the query response.

34 Claims, 6 Drawing Sheets

(56) References Cited

U.S. PATENT DOCUMENTS

| | | | | |
|---|---|---|---|---|
| 8,396,254 | B1* | 3/2013 | Hickman | G06T 7/0046 382/106 |
| 8,649,557 | B2* | 2/2014 | Hyung | G06T 7/208 382/103 |
| 8,830,512 | B2* | 9/2014 | Coccia | G01S 19/14 358/1.15 |
| 8,971,610 | B2* | 3/2015 | Kashiwagi | G06K 9/4671 382/154 |
| 2011/0123135 | A1 | 5/2011 | Hsieh et al. | |
| 2012/0121161 | A1 | 5/2012 | Eade et al. | |
| 2012/0237085 | A1 | 9/2012 | Meier | |
| 2012/0306850 | A1 | 12/2012 | Balan et al. | |

OTHER PUBLICATIONS

Hagbi N., et al., "Shape Recognition and Pose Estimation for Mobile Augmented Reality", IEEE Transactions on Visualization and Computer Graphics, IEEE Service Center, Los Alamitos, CA, US, vol. 17, No. 10, Oct. 1, 2011 (Oct. 1, 2011), XP011373312, ISSN-1077-2626, DOI-10.1109/TVCG.2010.241, pp. 1369-1379.

International Search Report and Written Opinion—PCT/US2014/016273—ISA/EPO—Jun. 2, 2014.

Uchiyama H., et al., "Object Detection and Pose Tracking for Augmented Reality, Recent Approaches", 18th Korea-Japan Joint Workshop on Frontiers of Computer Vision, Nov. 14, 2012 (Nov. 14, 2012), pp. 1-8, XP002724727, Retrieved from the Internet, URL:http:/fhal.inria.fr/hal-00751704/ [retrieved on May 21, 2014].

Arth, et al., "Real-time self-localization from panoramic images on mobile devices", IEEE International Symposium on Mixed and Augmented Reality, Science and Technolgy Proceedings, 2011, pp. 37-46.

Gammeter S., et al., "Server-side Object Recognition and Client-side Object Tracking for Mobile Augmented Reality," 2010 IEEE Computer Society Conference on Computer Vision and Pattern Recognition Workshops, IEEE, Piscataway, NJ, USA, Jun. 13, 2010 (Jun. 13, 2010), pp. 1-8, XP031728435, ISBN: 978-1-4244-7029-7.

* cited by examiner

CLIENT-SERVER BASED DYNAMIC SEARCH

FIELD

The present disclosure relates to the field of wireless communications. In particular, the present disclosure relates to performing search in a client-server environment.

BACKGROUND

With the proliferation of mobile devices such as smartphones, they may be used for detecting objects and performing augmented reality applications. However, due to limited storage space on such mobile devices, the local database, if exists, may only store a limited number of objects for supporting such visual search, which can adversely affect the accuracy of the object recognition. To obtain a better search quality, a mobile device may send images captured to a server to perform the object recognition.

Figure 1:
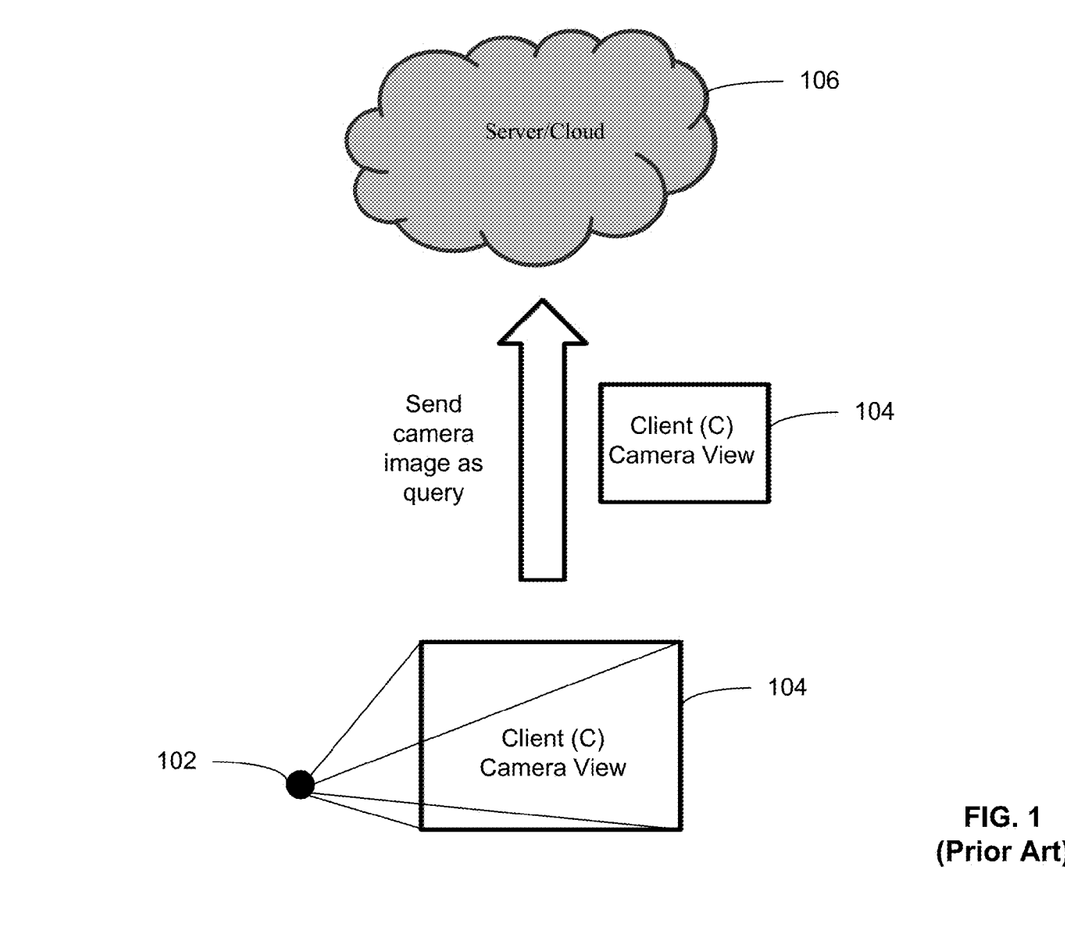
FIG. 1 illustrates a conventional method of performing a client-server based search.

FIG. 1 illustrates a conventional approach to perform a visual search. As shown in FIG. 1, a mobile device 102 sends a query image 104 as the query data to a server 106 (also referred to as the cloud). The server 106 may then extract two-dimensional (2D) features and associated descriptors from the query image 104, and matches these descriptors against the descriptors with three-dimensional (3D) positions in an object database (not shown) in the server 106, finding 2D-to-3D correspondences. This approach may be employed to identify an object and yield a pose relative to the mobile device 102 at the time the query image 104 was taken.

One of the problems with the above conventional approach is that there is a long latency involved in sending the query data to the server 106, processing the query, and returning the response data to the mobile device 102. During this time, the mobile device 102 may have moved from the position where the query image 104 was captured. As a result, a pose of the mobile device 102 computed by the server 106 may be out of date.

Another problem with the conventional approach shown in FIG. 1 is that the query image 104 contains a large amount of data that needs to be sent from the mobile device 102 to the server 106. This problem can get worse as the image resolution of the mobile device 102 continues to increase, from example, from 2 megapixels to 4 megapixels, etc. This increased query data can further delay the duration between the time the query images 104 may be sent to the time a query response may be received from the server 106.

Therefore, there is a need for method, apparatus and computer program product that can address the above issues of the conventional approach.

SUMMARY

The present disclosure relates to method, apparatus, and computer program product for performing a search. In one embodiment, the method of performing a search comprises receiving one or more images of an environment in view of a mobile device, generating a simultaneous localization and mapping of the environment using the one or more images, wherein the simultaneous localization and mapping of the environment comprises a plurality of map points representing a plurality of surfaces in a three dimensional coordinate system of the environment, sending a set of the plurality of map points as a search query to a server, receiving a query response from the server, and identifying an object in the environment based at least in part on the query response. According to aspects of the present disclosure, the plurality of map points comprises views of the plurality of surfaces captured by the mobile device from different angles.

According to aspects of the present disclosure, the plurality of map points comprises views of the plurality of surfaces captured by the mobile device from different angles. Each map point in the plurality of map points may comprise a three dimensional location, one or more descriptors of the three dimensional location, and a corresponding surface normal of the three dimensional location. In other approaches, each map point in the plurality of map points may comprise a representation from a direction orthogonal to a normal direction of the map point.

The method further comprises sending a set of the plurality of map points as a search query to the server at a first time instance, and receiving a query response from the server at a second time instance, and where the mobile device has a first pose relative to the object at the first time instance and the mobile device has a second pose relative to the object at the second time instance. The method may further comprise determining the second pose of the mobile device with respect to the object in the environment based at least in part on the query response received at the second time instance.

The method of determining the second pose of the mobile device with respect to the object in the environment comprises obtaining from the query response a pose of the object with respect to an origin of the environment, tracking a pose of the mobile device with respect to the origin of the environment, and determining the second pose of the mobile device with respect to the object using the pose of the object with respect to the origin of the environment and the pose of the mobile device with respect to the origin of the environment.

The method further comprises causing an augmentation to be rendered in response to the second pose of the mobile device with respect to the object in the environment. The method may further comprise tracking movement of the mobile device with respect to an origin of the environment, and determining the mobile device has moved with respect to the origin of the environment. The method of determining the mobile device has moved comprises at least one of: determining the mobile device has rotated more than a predetermined angle, and determining the mobile device has translated more than a predetermined distance.

The method further comprises identifying incremental map points captured by the mobile device in response to the movement of the mobile device, generating an updated simultaneous localization and mapping of the environment with the incremental map points captured by the mobile device, and sending the incremental map points captured by the mobile device in an updated search query to the server. The updated simultaneous localization and mapping of the environment can include views of the environment larger than a field of view of the environment from the mobile device; and wherein the origin of the environment is out of the field of view of the mobile device.

In another embodiment, a mobile device comprises a control unit including processing logic, the processing logic comprises logic configured to receive one or more images of an environment in view of the mobile device, logic configured to generate a simultaneous localization and mapping of the environment using the one or more images, where the simultaneous localization and mapping of the environment comprises a plurality of map points representing a plurality of surfaces in a three dimensional coordinate system of the environment, logic configured to send a set of the plurality of map points as a search query to a server, logic configured to receive a query response from the server, and logic configured to identify an object in the environment based at least in part on the query response.

In yet another embodiment, a computer program product comprises a non-transitory medium storing instructions for execution by one or more computer systems; the instructions comprises instructions for receiving one or more images of an environment in view of a mobile device, instructions for generating a simultaneous localization and mapping of the environment using the one or more images, where the simultaneous localization and mapping of the environment comprises a plurality of map points representing a plurality of surfaces in a three dimensional coordinate system of the environment, instructions for sending a set of the plurality of map points as a search query to a server, instructions for receiving a query response from the server, and instructions for identifying an object in the environment based at least in part on the query response.

In yet another embodiment, an apparatus comprises means for receiving one or more images of an environment in view of a mobile device, means for generating a simultaneous localization and mapping of the environment using the one or more images, where the simultaneous localization and mapping of the environment comprises a plurality of map points representing a plurality of surfaces in a three dimensional coordinate system of the environment, means for sending a set of the plurality of map points as a search query to a server, means for receiving a query response from the server, and means for identifying an object in the environment based at least in part on the query response.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Embodiments of methods and apparatuses for client-server based search are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 2:
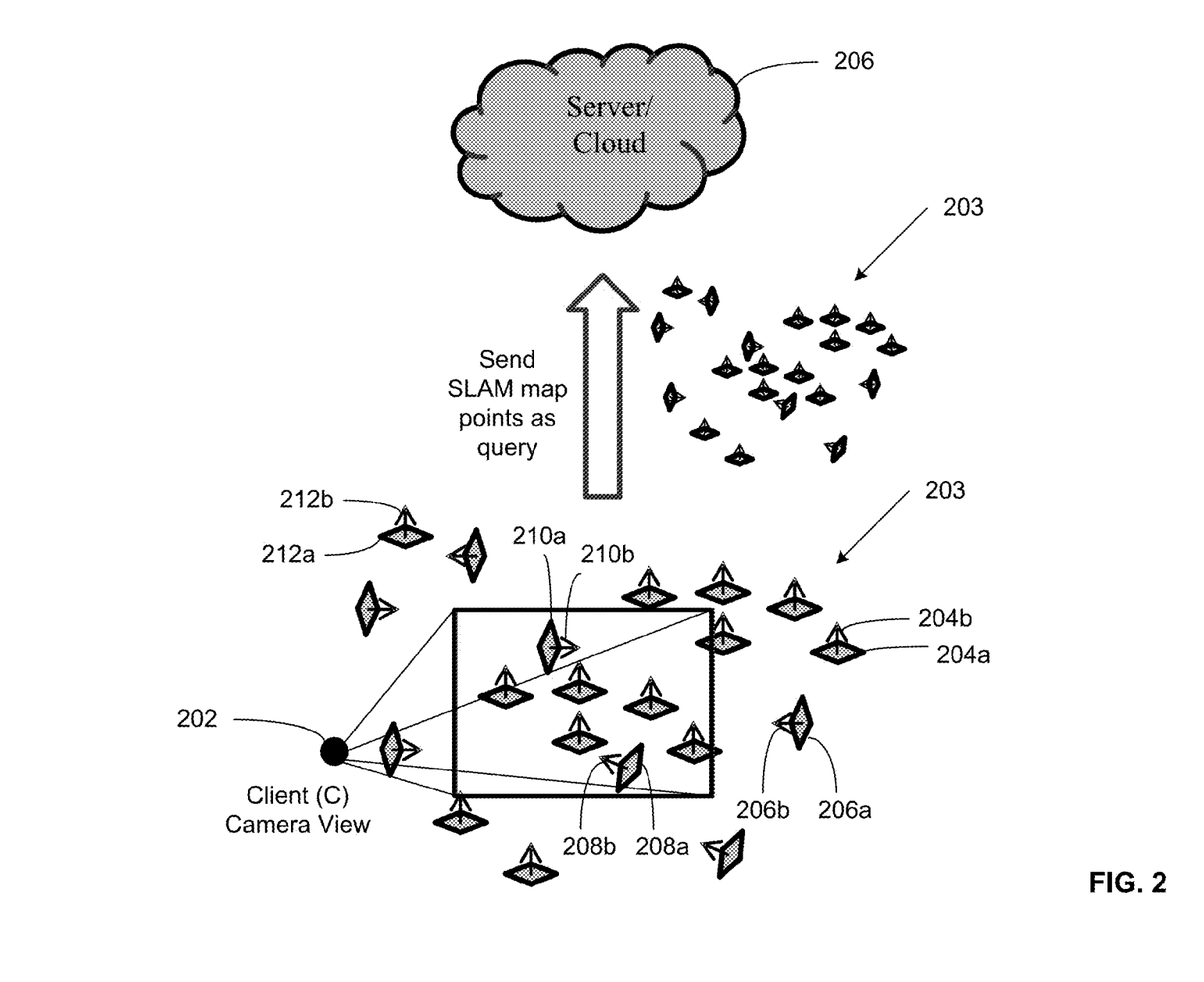
FIG. 2 illustrates a method of performing a client-search based search according to some aspects of the present disclosure.

FIG. 2 illustrates a method of performing a client-search based search according to some aspects of the present disclosure. According to aspects of the present disclosure, a simultaneous localization and tracking (SLAM) framework may be employed by a mobile device in conjunction with a server-based detection system. In the exemplary approach shown in FIG. 2, a mobile device 202 (also referred to as a client device or client for short, represented by the black circle) can be configured to build up a SLAM environment 203, while enabling a pose of the mobile device relative to the SLAM environment 203 to be computed by a server 206. The SLAM environment 203 can be a dense mesh or a dense/sparse point cloud, for example, with 3D positions relative to the SLAM environment 203 coordinate frame origin (shown in FIG. 3). Each map point may include one or more descriptors that describe the visual appearance of the map point, and/or 3D structural information about the point if the map is a mesh. For example, surface 204a and its corresponding surface normal 204b, surface 206a and its corresponding surface normal 206b, surface 208a and its corresponding surface normal 208b, surface 210a and its corresponding surface normal 210b, and surface 212a and its corresponding surface normal 212b describe various exemplary map points in the SLAM environment 203.

Note that the map points may be captured by the mobile device 202 over a series of image frames. For example, map points 204a and 206a may be captured in a first image frame; map points 208a and 210a may be captured in a second image frame; and map point 212a may be captured in a third image frame. As the mobile device 202 moves around, additional map points may be captured and added to the SLAM environment, and the updated SLAM environment may then be sent to the server.

According to aspects of the present disclosure, map points that make up the SLAM environment may be sent as the search query. Each map point may include a 3D location, a surface normal and one or more descriptors representing the map point. Object and pose detection on the server may then involve matching the descriptors from the SLAM map against the descriptors from the object database, forming 3D-to-3D correspondences. A similarity transform may then be estimated in order to obtain the pose of the object relative to the origin of the SLAM environment, as the map points have 3D locations in the SLAM environment coordinate frame.

According to aspects of the present disclosure, the pose of the mobile device 202 can be tracked relative to the SLAM environment coordinate frame. By accumulating a SLAM environment and sending the map points as the query information to the server, the query response may include the detected object pose relative to an origin of the SLAM environment, rather than relative to the mobile device 202 at the time the search query is formulated. Using the SLAM framework, the disclosed approach can reduce the amount of data to be sent from the mobile device 202 to the server 206 and thus can reduce the network delay, allowing live poses of the object to be computed from the query response. This approach also enables information from multiple viewpoints, as opposed to a single query image in the conventional approach described in FIG. 1, to be sent as a search query, and thus may produce better results in object detection and tracking.

According to aspects of the present disclosure, SLAM is the process of calculating the position and orientation of a sensor with respect to an environment, whilst simultaneously building up a map of the environment. The aforementioned sensor can be an array of one or more cameras, capturing information from the scene. This information may be one or a combination of visual information (e.g. standard imaging device) or direct depth information (e.g. passive stereo or active depth camera). An output from the SLAM system can be a sensor pose (position and orientation) relative to the environment, as well as some form of map, comprising of at least sparse points (which may include normal information), and/or a dense surface mesh.

Figure 3:
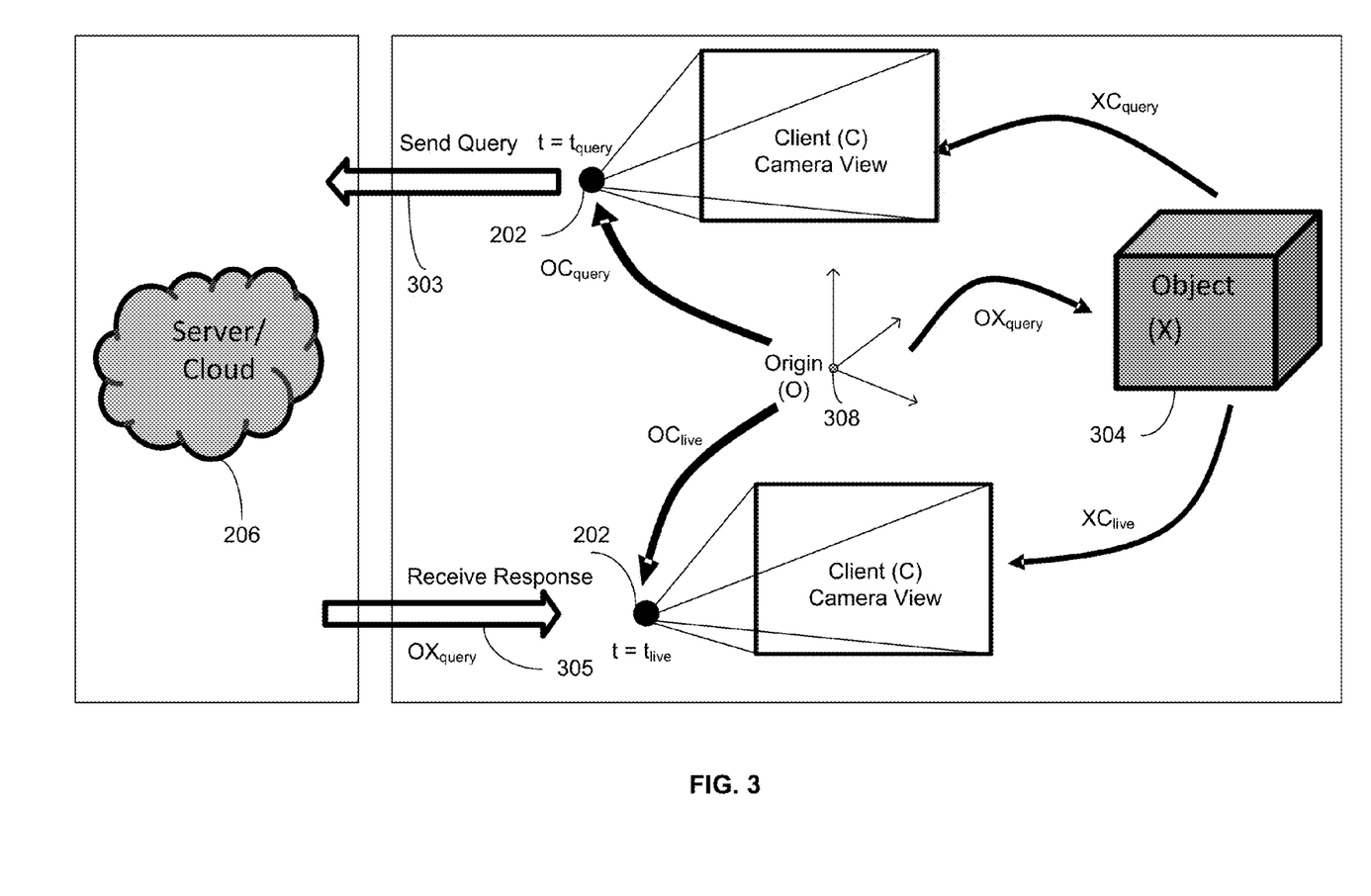
FIG. 3 illustrates a method of determining pose of a mobile device with respect to an object according to some aspects of the present disclosure.

FIG. 3 illustrates a method of determining pose of a mobile device with respect to an object according to some aspects of the present disclosure. As shown in FIG. 3, mobile device 202, also referred to as client (C) device, is represented by a black circle; object 304 is represented by letter X; and server 206 is represented by the grey cloud. $XC_{query}$ represents a pose of the object 304 relative to the client device 202 at time $t=t_{query}$; $XC_{live}$ represents a pose of the object 304 relative to the client device 202 at time $t=t_{live}$; $OX_{query}$ represents a pose of the object 304 relative to an origin 308 of the SLAM environment (also referred to as the origin for short) at time $t=t_{query}$; $OC_{query}$ represents a pose of the client device 202 relative to the origin 308 at time $t=t_{query}$; $OC_{live}$ represents a pose of the client device 202 relative to the origin 308 at time $t=t_{live}$.

At time $t=t_{query}$, a search query (represented by arrow 303) may be sent to the server 206. Whilst the search query 303 is being processed, the mobile client 202 may continue to move. The SLAM framework on the mobile client 202 can be used to compute the pose of the client device 202 relative to an origin 308 of the SLAM environment (OC). At time $t=t_{live}$, the client device 202 receives a query response (represented by arrow 305) from the server 206. Note that the query response sent back may be a pose of the object relative to the coordinate frame of $C_{query}$ and $XC_{query}$, which may be an out-of-date pose from the current client device's point of view, $C_{live}$. As indicated in the description of FIG. 1, this difference may be due to network and processing latency, which may not be useful for the conventional image-based search. On the other hand, according to aspects of the present disclosure, the query response 305 received from the server 206 can still be used because it may be viewed or utilized relative to the origin 308 of the SLAM environment ($OX_{query}$). Thus, as the pose of the current client device 202 may be determined, the transformation from the object coordinate frame to the client device coordinate frame ($XC_{live}$) can be computed for the purposes of object augmentation.

In one approach, the live pose of the object 304 relative to the client device 202 ($XC_{live}$) can be computed from the query response 305 ($OX_{query}$). This is because the transformation from the client device 202 to the origin 308 of the SLAM environment ($OC_{live}$) can be tracked and determined. The relative pose of the object 304 to the client device 202 ($XC_{live}$) may also be determined by the relationship of:

$$XC_{live}=OC_{live}\times(OX_{query})^{-1}.$$

According to aspects of the present disclosure, a plurality of map points may be sent as a search query. In one embodiment, only map points which have been added to the map since the last query may be sent in the query. Note that search queries that have been previously sent can be stored and cached by the server 206. This enables the server 206 to search over all map points from the mobile device 202, without those points having to be transmitted to the server 206 each time. In another approach, the mobile device 202 may send the whole map each time, which would mean no temporary storage would be required on the server 206.

According to aspects of the present disclosure, the server 206 may include a database of keypoints and descriptors with 3D position information (and potentially surface normals), similar to map points transmitted in the query. The keypoints and descriptors on the server 206, however, may correspond to portions of database objects, and may be generated beforehand in an offline process. In some implementations, an efficient data structure for search may be created on the server 206 so that nearest neighbor search between descriptors can be quickly computed. These data structures can take the form of trees (such as K-means, kD-trees, binary trees), hash tables, or nearest neighbor classifiers. The search to identify if there are any database objects in the SLAM map sent by the mobile device 202 involves finding nearest neighbors of map point descriptors in the server's database of descriptors. Descriptors on the server 206 and mobile device 202 are vectors representing the appearance of a portion of an object or scene. Possible descriptors may include, but are not limited to, SIFT and SURF.

Each map point sent by the mobile device 202 may have a set of 0 to N nearest neighbor correspondences identified through the process of a search query. These correspondences can be stored by the server 206 for efficiency so that they may not be computed again for the next search query. After the correspondences have been identified, a voting step may occur, where the number of correspondences found for certain objects can lead to a decision that certain object are highly likely to be present in the SLAM map. For each of these highly likely present objects, a process of geometric verification may be used to filter out inlier correspondences from outlier correspondences. This geometric verification can involve relative 3D position constraints, descriptor rotation constraints and normal direction constraints. The result of geometric verification is a set of correspondences between map points sent from the device and an object in the server database.

Map points may comprise at least a 3D position relative to the SLAM map origin and a descriptor, so matching against descriptors in the server 206 (which also have 3D positions) may yield a series of 3D-to-3D correspondences. This can enable a similarity transform (7-degree of freedom: 3D rotation, 3D position, scale) to be computed between the server's database points and the corresponding SLAM map points which are thought to represent the object. This similarity transform may encode the position, orientation and scale of an object relative to the SLAM map origin. This may be transmitted back to the mobile device 202 as the query response along with other useful information, such as which map points in the SLAM map correspond to the server object, and content associated to the database object. In the case where the scale of both the SLAM map and object map may be known (e.g. both absolute metric scale), there may be no scale difference, and just a 3D pose may be enough to represent the relationship between the object and the SLAM map origin.

The process of search using a server 206 can be relatively slow compared to the frame-rate of the camera, often taking 10s of frames before the query response may be received. However, whilst server 206 processes the search query, the client may perform visual pose tracking using SLAM relative to the SLAM map origin 308. Therefore, due to the search query computing a transformation relative to the SLAM map origin 308, after the query response has been computed, the relative transformation between object and camera can be computed by chaining the transformation from camera to SLAM map origin 308, and the transformation from SLAM map origin 308 to the object 304.

In addition to using the SLAM framework to track the pose of the mobile device 202, it may also be used to determine when to send search queries to the server 206. When using the map points as query data, several optimizations may be made. For example, portions of the SLAM environment may be sent to the server 206 incrementally, which can be a significant improvement over the conventional approach of using a dedicated single image query. In some implementations, as new map points are added to the SLAM map, a background process may be employed to stream the new map points to the server 206 from the client device 202. The server 206 may be configured to have session handling capabilities, and may be configured to perform a query using the whole map (including the new map points) by caching previous results (e.g. from descriptor matching), while not require to reprocess the whole SLAM map. This approach can support incremental queries to be processed, which in turn can improve the efficiency of object detection and augmented reality applications, compared to querying a completely new map of the same size. With this approach, there can be a stream of new information as it becomes available as the size of the SLAM map extends, rather than having distinct decision points at which a query image is sent. As a result, the disclosed approach optimizes the amount of information sent to the server 206 as new information may be sent; compared to image-based queries where different images may be sent to the server 206, although they may mostly present a view of the same scene. Another benefit of the disclosed approach is that it may reduce the round-trip processing time to the server compared to the image-based approach, where a whole image may be uploaded and may be processed afresh.

In situations when an object is very large (such as a building), it may not fit into a single camera image query, which may make the task of detecting that object difficult using the conventional method as described in FIG. 1. On the other hand, according to aspects of the present disclosure, the ability to update the SLAM environment incrementally can enable the disclosed method to map a large object, such as a football stadium, incrementally, even though the whole football stadium may not be able to be captured in a single camera view. In addition, the ability to send portions of the SLAM environment to the server as a search query can improve the recognition rate of large objects because the disclosed method may be able to use information from the entire object in a search query.

When detecting 3D objects, the conventional approach uses a camera image as a search query may be severely disadvantaged because the image is a 2D projection of the 3D scene, and thus may represent a single viewpoint. Using a SLAM environment as the query data, the object may be mapped from multiple angles and the information captured may be submitted as the search query. Thus, the disclosed method of using information captured from multiple angles may produce better results in distinguishing an object from other objects that might look the same from certain viewpoints.

Figure 4:
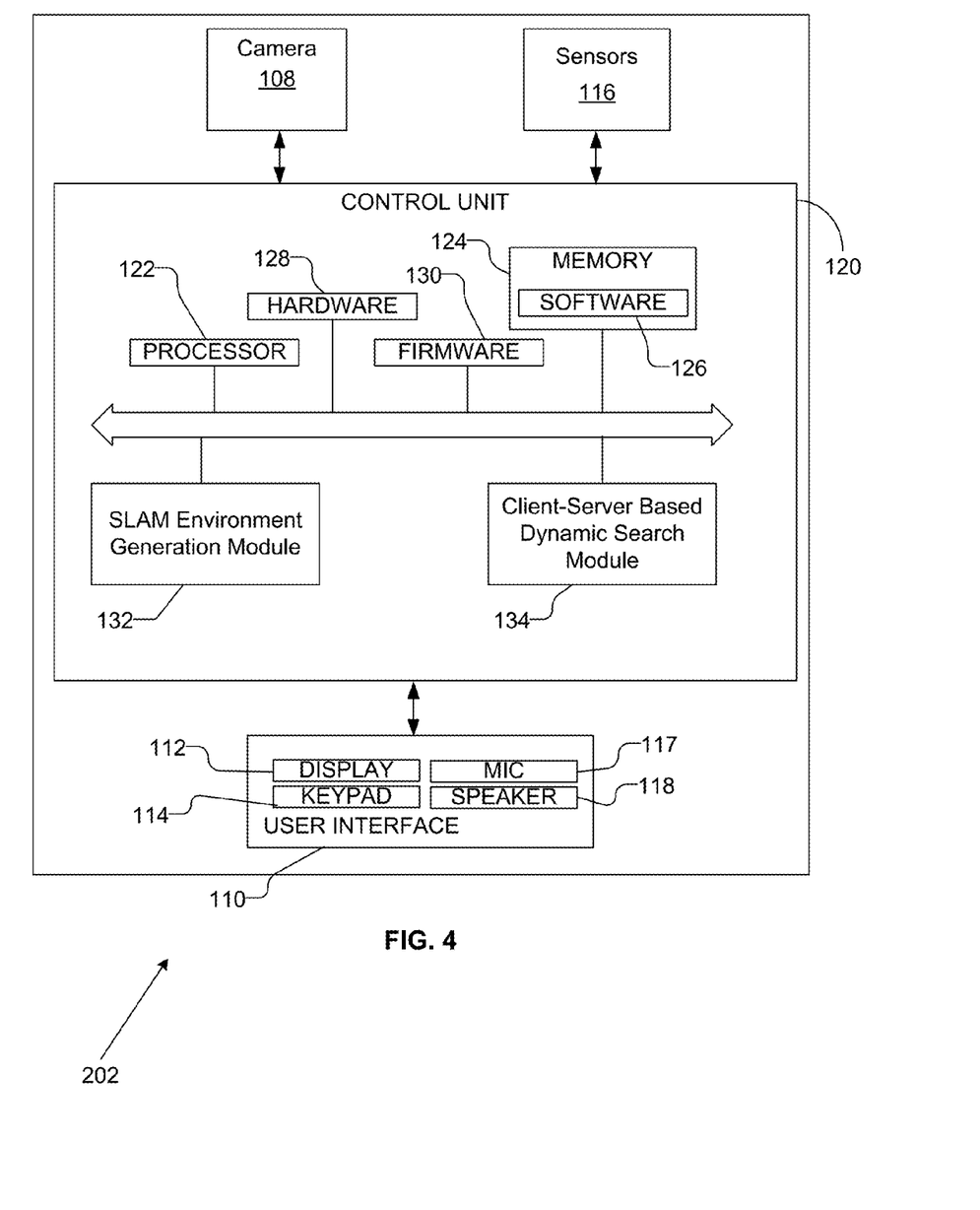
FIG. 4 illustrates an exemplary block diagram of a mobile device configured to perform client-server based search according to some aspects of the present disclosure.

FIG. 4 illustrates an exemplary block diagram of a mobile device configured to perform client-server based search according to some aspects of the present disclosure. The mobile device 202 includes a camera 108 for capturing images of the environment, which may be either individual photos or frames of video. The mobile device 202 may also include sensors 116, which may be used to provide data with which the mobile device 202 can determine its position and orientation, i.e., pose. Examples of sensors that may be used with the mobile device 202 include accelerometers, quartz sensors, gyros, micro-electromechanical system (MEMS) sensors used as linear accelerometers, as well as magnetometers.

The mobile device 202 may also include a user interface 110 that includes display 112 capable of displaying images. The user interface 110 may also include a keypad 114 or other input device through which the user can input information into the mobile device 202. If desired, the keypad 114 may be obviated by integrating a virtual keypad into the display 112 with a touch sensor. The user interface 110 may also include a microphone 117 and one or more speakers 118, for example, if the mobile platform is a cellular telephone. Of course, mobile device 202 may include other components unrelated to the present disclosure.

The mobile device 202 further includes a control unit 120 that is connected to and communicates with the camera 108 and sensors 116, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a SLAM environment generation module 132 configured to generate the SLAM map based on information captured by the mobile device 202. The control unit 120 further includes a client-server based dynamic search module 134 configured to detect objects of interest and configured to determine or track poses of the mobile device 202 relative to the objects of interest. The SLAM environment generation module 132 and client-server based dynamic search module 134 are illustrated separately from processor 122 and/or hardware 128 for clarity, but may be combined and/or implemented in the processor 122 and/or hardware 128 based on instructions in the software 126 and the firmware 130. Note that control unit 120 can be configured to implement methods of performing client-server based dynamic search. For example, the control unit 120 can be configured to implement functions of the mobile device 202 described in FIG. 2, FIG. 3 and FIG. 6A-6B.

Figure 5:
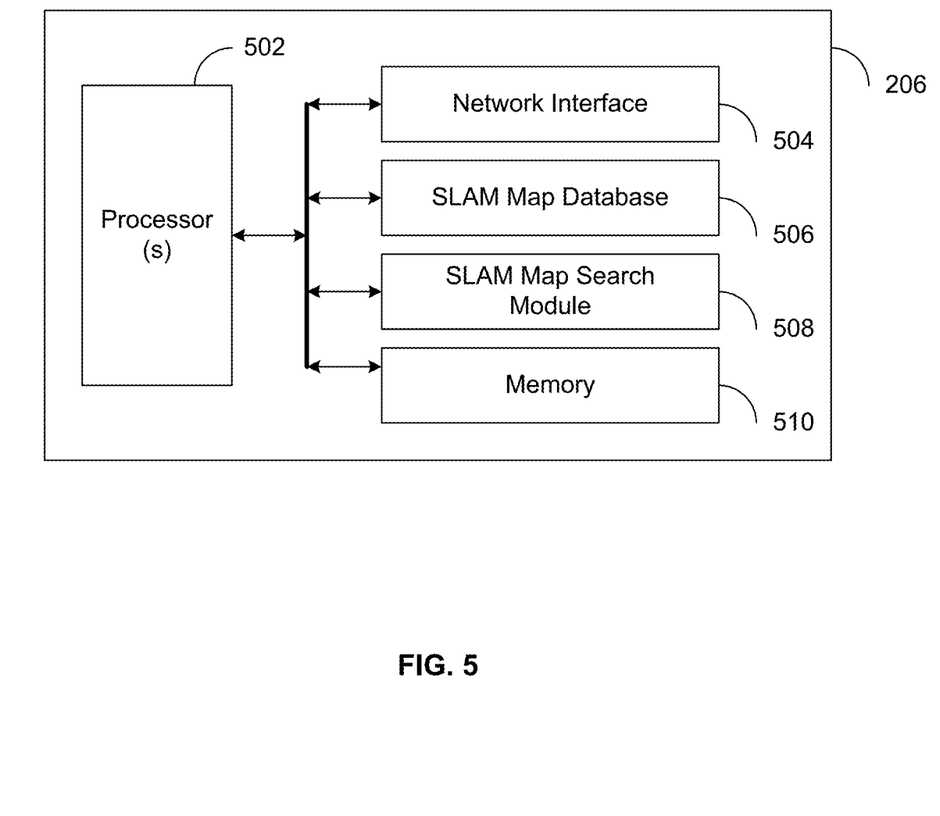
FIG. 5 illustrates a block diagram of a server for performing client-server based search according to some aspects of the present disclosure.

FIG. 5 illustrates a block diagram of a server for performing client-server based search according to some aspects of the present disclosure. In the example shown in FIG. 5, server 206 includes one or more processors 502, network interface 504, SLAM map database 506, SLAM map search module 508, and memory 510. The one or more processors 502 can be configured to control operations of the server 206. The network interface 504 can be configured to communicate with a network (not shown), which may be configured to communicate with other servers, computers, and mobile devices. The SLAM map database 506 can be configured to store SLAM maps of different venues, landmarks, maps, and other user-defined information. The SLAM map search module 508 can be configured to implement methods of performing client-server based dynamic search using the SLAM map database 506. For example, the SLAM map search module 508 can be configured to implement functions of the server 206 described in FIG. 2, FIG. 3 and FIG. 6A-6B. The memory 510 can be configured to store program codes, instructions and data for the server 206.

According to embodiments of the present disclosure, the SLAM map database 506 may be spatially organized. For each object, the mobile device orientation may be determined using sensors embedded in the mobile device. In searching the SLAM map database 506, the method may initially focus on searching for map points within a neighborhood of the mobile device's orientation. In another approach, the search may focus on matching map points for an object captured by the mobile device, and use the initial search result to assist subsequent searches of the SLAM map database. In yet another approach, searching the SLAM map database may be assisted by using approximate location information obtained from GPS, A-GPS, or Skyhook style WiFi position. The various methods described above can be applied to improve the efficiency of searching for objects in the SLAM map database.

Figure 6A:
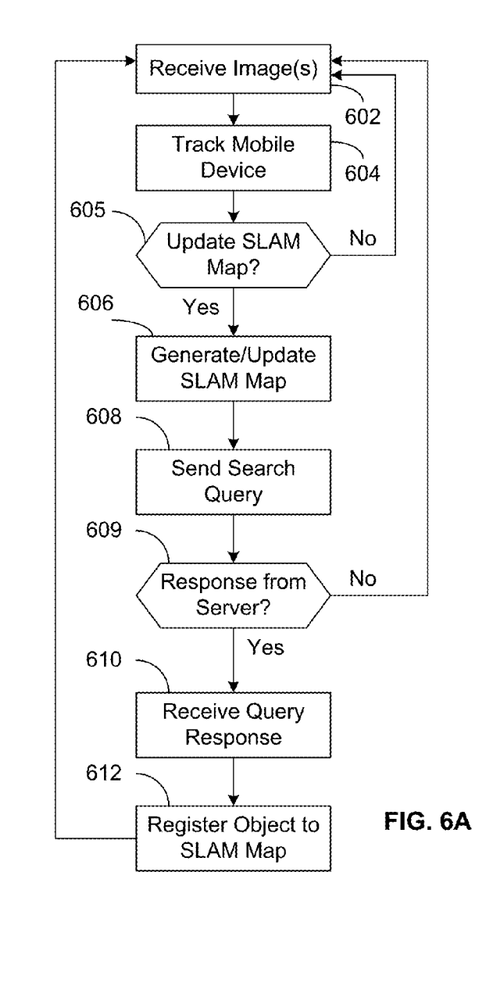
FIG. 6A and FIG. 6B illustrate an exemplary method of performing a client-server based search according to some aspects of the present disclosure.
Figure 6B:
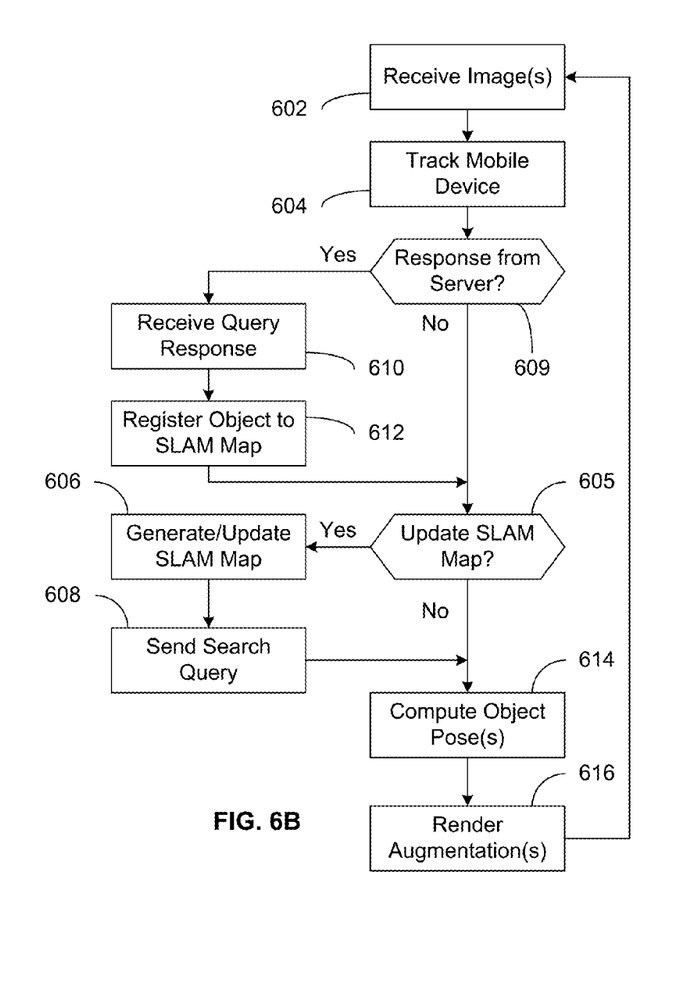

FIG. 6A and FIG. 6B illustrate an exemplary method of performing a client-server based search according to some aspects of the present disclosure. According to aspects of the present disclosure, the methods of object recognition are illustrated in FIG. 6A and the methods of tracking are illustrated in FIG. 6B. Note that the methods described in FIG. 6A and FIG. 6B may be performed by the mobile device 202 in parallel. Although some of the blocks shown in FIG. 6A and FIG. 6B perform the same methods (and are thus labeled with the same numerals), for the purposes of illustration, the flow diagrams of the methods are shown separately. In other implementations, the two flow diagrams may be combined to form a single flow diagram.

Referring to FIG. 6A, in block 602, the control unit 120 can be configured to receive one or more images from camera 108 of the mobile device 202 or receive one or more images from other devices via one or more wireless communication protocols. According to aspects of the present disclosure, the images may be received intermittently or continuously. In block 604, the control unit 120 can be configured to track the mobile device. For example, the control unit 120 can be configured to track movement of the mobile device with respect to an origin of the environment, and determine the mobile device has moved with respect to the origin of the environment. In addition, the control unit 120 can be configured to determine whether the mobile device has rotated more than a predetermined angle, and/or determine whether the mobile device has translated more than a predetermined distance. In block 605, the control unit 120 can be configured to determine whether to update the SLAM map. If it is determined to update the SLAM map (605_Yes), the method moves to block 606. Alternatively, if it is determined not to update the SLAM map (605_No), the method moves back to block 602.

In block 606, the control unit 120 can be configured to generate or update the SLAM map of the environment using the one or more images received. According to aspects of the present disclosure, the SLAM map may include a plurality of map points representing a plurality of surfaces in a three dimensional coordinate system of the environment. The plurality of map points may comprise views of the plurality of surfaces captured by the mobile device from different angles. In some implementations, each map point in the plurality of map points comprises a three dimensional location, one or more descriptors of the three dimensional location, and a corresponding surface normal of the three dimensional location. Examples of the one or more descriptors may comprise a set of scale-invariant feature transform (SIFT) descriptors and surface normals of the plurality of surfaces, and/or a set of speed up robust features (SURF) descriptors and surface normals of the plurality of surfaces. In some other implementations, each of a map point in the plurality of map points comprises a representation from a direction orthogonal to a normal direction of the map point.

According to aspects of the present disclosure, the control unit 120 can be configured to identify incremental map points captured by the mobile device in response to the movement of the mobile device, generate an updated simultaneous localization and mapping of the environment with the incremental map points captured by the mobile device, and send the incremental map points captured by the mobile device in an updated search query to the server. Note that the updated simultaneous localization and mapping of the environment may include views of the environment larger than a field of view of the environment from the mobile device; and where the origin of the environment can be out of the field of view of the mobile device.

In block 608, the control unit 120 can be configured to send a set of the plurality of map points as a search query to a server. In block 609, the control unit 120 can be configured to determine whether there is a response from the server 206. If there is a response (609_Yes), the method moves to block 610. Alternatively, if there is no response (609_No), the method moves back to block 602. In block 610, the control unit 120 can be configured to receive the query response from the server 206. In block 612, the control unit 120 can be configured to register the object being searched to the SLAM map.

Referring to FIG. 6B, note that some of the blocks are the same blocks described in FIG. 6A, and thus the descriptions of the same blocks provided in FIG. 6A may also apply to the same block in FIG. 6B. For simplicity, the same blocks are described below in association with FIG. 6B for maintaining the overall structure of the methods. In block 602, the control unit 120 can be configured to receive one or more images from camera 108 of the mobile device 202 or receive one or more images from other devices via one or more wireless communication protocols. In block 604, the control unit 120 can be configured to track the mobile device.

In block 609, the control unit 120 can be configured to determine whether there is a response from the server 206. If there is a response (609_Yes), the method moves to block 610. Alternatively, if there is no response (609_No), the method moves back to block 605. In block 610, the control unit 120 can be configured to receive the query response from the server 206. In block 612, the control unit 120 can be configured to register the object being searched to the SLAM map. In block 605, the control unit 120 can be configured to determine whether to update the SLAM map. If it is determined to update the SLAM map (605_Yes), the method moves to block 606. Alternatively, if it is determined not to update the SLAM map (605_No), the method moves to block 614. In block 606, the control unit 120 can be configured to generate or update the SLAM map of the environment using the one or more images received and/or with the query response received from the server 206. In block 608, the control unit 120 can be configured to send a set of the plurality of map points as a search query to a server.

In block 614, the control unit 120 can be configured to compute the pose(s) of the object(s) with respect to the SLAM map environment. In some implementations, the control unit 120 can be configured to obtain from the query response a pose of the object with respect to an origin of the environment, tracking a pose of the mobile device with respect to the origin of the environment, and determining a pose of the mobile device with respect to the object using the pose of the object with respect to the origin of the environment and the pose of the mobile device with respect to the origin of the environment. In block 616, the control unit 120 can be configured to render augmentation(s) using the pose of the object determined in block 614.

Note that the flow diagrams are shown for the purpose of illustration only. In some other implementations, the blocks of the flow diagram may be arranged to form other implementations, for example, the methods of block 604 may be performed before, after, or in parallel with the methods of block 606. In yet some other implementations, the method may move from block 602 to block 605 without performing the methods of block 604, for example.

One of the benefits of the disclosed approach is in detecting similar targets. Since the SLAM map database at the server may usually be very large, and may include many objects with similar, but not identical, visual appearances. Given a search query from the mobile device related to one of these visually similar objects, the server may be able to successfully identify the correct object. However, with conventional search systems that uses a detection database resided locally on a mobile device, it may be likely that that a wrong object with similar appearance may be detected. This probability may become large if there are visually similar objects of the real object in the local database, and such visually similar objects may not be the real object in view of the client device.

In the conventional approach as shown in FIG. 1, as long as the mobile device does not have data about all objects in the server database, there can be no guarantee that the correct object in the database may be detected. This is due to the desire that local detection may be robust to things like occlusion and small changes in appearance due to variations in the manufacturing process of the object and the camera imaging process. This issue can be addressed by the disclosed method that performs not only object detection, but also object pose estimation on the server, where information of a more complete set of objects may be stored.

Another benefit of the present disclosure is in addressing the issue of when to send search queries (or additional information captured) from the mobile device to the server. The disclosed approach addresses the balance between optimizing the amount of data sent against speed of object detection, which may impact the user experience of the mobile device. According to aspects of the present disclosure, various methods may be employed, such as using a scene change algorithm to detect when the appearance of the client image has changed sufficiently to warrant a query to be sent. Using the SLAM framework can provide continuous information about the pose of the mobile device relative to an object or a scene, such information can be used to decide when to send queries to the server.

Another benefit of the present disclosure is in detecting large objects. In some situations, large objects may not fit into a single camera view, which means detecting large objects may be naturally disadvantaged using visual search queries if the camera image is used as the search query as described in FIG. 1. On the other hand, the disclosed methods may be configured to incrementally accumulate data (SLAM map points) describing a large object, and send search queries that include the updated SLAM map points to enable large objects to be detected more reliably.

Another benefit of the present disclosure is in disambiguating 3D objects. In the conventional approach described in FIG. 1, using a camera image as query data means sending a 2D projection of the 3D object from a single viewpoint, which may be difficult in detecting 3D objects as many 3D objects may look similar from certain viewpoints. On the other hand, the disclosed methods can accumulate information about an object from different viewpoints and send such information as search queries that enable similar 3D objects to be disambiguated from each other.

Note that at least paragraphs [0061]-[0065], FIG. 4, FIG. 5, FIG. 6A and FIG. 6B and their corresponding descriptions provide means for means for receiving one or more images of an environment in view of a mobile device, means for generating a simultaneous localization and mapping of the environment using the one or more images, where the simultaneous localization and mapping of the environment comprises a plurality of map points representing a plurality of surfaces in a three dimensional coordinate system of the environment, means for sending a set of the plurality of map points as a search query to a server, means for receiving a query response from the server, and means for identifying an object in the environment based at least in part on the query response.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of performing a search, comprising:
receiving a plurality of images of an environment in view of a mobile device;
generating a simultaneous localization and mapping of the environment using the plurality of images, wherein the simultaneous localization and mapping of the environment comprises a plurality of map points representing a plurality of surfaces in a three dimensional coordinate system of the environment;
sending a set of the plurality of map points as a search query to a server at a first time instance;
receiving a query response from the server at a second time instance; and
identifying an object in the environment based at least in part on the query response, wherein the mobile device has a first pose relative to the object at the first time instance and the mobile device has a second pose relative to the object at the second time instance.

2. The method of claim 1, wherein the plurality of map points comprises:
views of the plurality of surfaces captured by the mobile device from different angles.

3. The method of claim 2, wherein each of a map point in the plurality of map points comprises a three dimensional location, one or more descriptors of the three dimensional location, and a corresponding surface normal of the three dimensional location.

4. The method of claim 2, wherein each of a map point in the plurality of map points comprises a representation from a direction orthogonal to a normal direction of the map point.

5. The method of claim 1, further comprising:
determining the second pose of the mobile device with respect to the object in the environment based at least in part on the query response received at the second time instance.

6. The method of claim 5, wherein determining the second pose of the mobile device with respect to the object in the environment comprises:
obtaining from the query response a pose of the object with respect to an origin of the environment;
tracking a pose of the mobile device with respect to the origin of the environment; and
determining the second pose of the mobile device with respect to the object using the pose of the object with respect to the origin of the environment and the pose of the mobile device with respect to the origin of the environment.

7. The method of claim 5, further comprising:
causing an augmentation to be rendered in response to the second pose of the mobile device with respect to the object in the environment.

8. The method of claim 1 further comprising:
tracking movement of the mobile device with respect to an origin of the environment; and
determining the mobile device has moved with respect to the origin of the environment.

9. The method of claim 8, wherein determining the mobile device has moved comprises at least one of:
determining the mobile device has rotated more than a predetermined angle; and
determining the mobile device has translated more than a predetermined distance.

10. The method of claim 8, further comprising:
identifying incremental map points captured by the mobile device in response to the movement of the mobile device;
generating an updated simultaneous localization and mapping of the environment with the incremental map points captured by the mobile device; and
sending the incremental map points captured by the mobile device in an updated search query to the server.

11. The method of claim 10, wherein the updated simultaneous localization and mapping of the environment includes views of the environment larger than a field of view of the environment from the mobile device; and wherein the origin of the environment is out of the field of view of the mobile device.

12. A mobile device, comprising:
a camera configured to receive a plurality of images of an environment in view of the mobile device;
a control unit configured to generate a simultaneous localization and mapping of the environment using the plurality of images, wherein the simultaneous localization and mapping of the environment comprises a plurality of map points representing a plurality of surfaces in a three dimensional coordinate system of the environment;
a network interface configured to send a set of the plurality of map points as a search query to a server at a first time instance; the network interface is further configured to receive a query response from the server at a second time instance; and
the control unit is further configured to identify an object in the environment based at least in part on the query response, wherein the mobile device has a first pose relative to the object at the first time instance and the mobile device has a second pose relative to the object at the second time instance.

13. The mobile device of claim 12, wherein the plurality of map points comprises:
views of the plurality of surfaces captured by the mobile device from different angles.

14. The mobile device of claim 13, wherein each of a map point in the plurality of map points comprises a three dimensional location, one or more descriptors of the three dimensional location, and a corresponding surface normal of the three dimensional location.

15. The mobile device of claim 13, wherein each of a map point in the plurality of map points comprises a representation from a direction orthogonal to a normal direction of the map point.

16. The mobile device of claim 12, further comprising:
logic configured to determine the second pose of the mobile device with respect to the object in the environment based at least in part on the query response received at the second time instance.

17. The mobile device of claim 16, wherein logic configured to determine the second pose of the mobile device with respect to the object in the environment comprises:
logic configured to obtain from the query response a pose of the object with respect to an origin of the environment;
logic configured to track a pose of the mobile device with respect to the origin of the environment; and
logic configured to determine the second pose of the mobile device with respect to the object using the pose of the object with respect to the origin of the environment and the pose of the mobile device with respect to the origin of the environment.

18. The mobile device of claim 16, further comprising:
logic configured to cause an augmentation to be rendered in response to the second pose of the mobile device with respect to the object in the environment.

19. The mobile device of claim 12 further comprising:
logic configured to track movement of the mobile device with respect to an origin of the environment; and
logic configured to determine the mobile device has moved with respect to the origin of the environment.

20. The mobile device of claim 19, wherein logic configured to determine the mobile device has moved comprises at least one of:
logic configured to determine the mobile device has rotated more than a predetermined angle; and
logic configured to determine the mobile device has translated more than a predetermined distance.

21. The mobile device of claim 19, further comprising:
logic configured to identify incremental map points captured by the mobile device in response to the movement of the mobile device;
logic configured to generate an updated simultaneous localization and mapping of the environment with the incremental map points captured by the mobile device; and
logic configured to send the incremental map points captured by the mobile device in an updated search query to the server.

22. The mobile device of claim 21, wherein the updated simultaneous localization and mapping of the environment includes views of the environment larger than a field of view of the environment from the mobile device; and wherein the origin of the environment is out of the field of view of the mobile device.

23. A computer program product comprising a non-transitory medium storing instructions for execution by one or more computer systems, the instructions comprising:
   instructions for receiving a plurality of images of an environment in view of a mobile device;
   instructions for generating a simultaneous localization and mapping of the environment using the plurality of images, wherein the simultaneous localization and mapping of the environment comprises a plurality of map points representing a plurality of surfaces in a three dimensional coordinate system of the environment;
   instructions for sending a set of the plurality of map points as a search query to a server at a first time instance;
   instructions for receiving a query response from the server at a second time instance; and
   instructions for identifying an object in the environment based at least in part on the query response, wherein the mobile device has a first pose relative to the object at the first time instance and the mobile device has a second pose relative to the object at the second time instance.

24. The computer program product of claim 23, wherein the plurality of map points comprises:
   views of the plurality of surfaces captured by the mobile device from different angles.

25. The computer program product of claim 24, wherein each of a map point in the plurality of map points comprises a three dimensional location, one or more descriptors of the three dimensional location, and a corresponding surface normal of the three dimensional location.

26. The computer program product of claim 24, wherein each of a map point in the plurality of map points comprises a representation from a direction orthogonal to a normal direction of the map point.

27. The computer program product of claim 23, further comprising:
   instructions for determining the second pose of the mobile device with respect to the object in the environment based at least in part on the query response received at the second time instance.

28. The computer program product of claim 27, wherein instructions for determining the second pose of the mobile device with respect to the object in the environment comprises:
   instructions for obtaining from the query response a pose of the object with respect to an origin of the environment;
   instructions for tracking a pose of the mobile device with respect to the origin of the environment; and
   instructions for determining the second pose of the mobile device with respect to the object using the pose of the object with respect to the origin of the environment and the pose of the mobile device with respect to the origin of the environment.

29. The computer program product of claim 27, further comprising:
   instructions for causing an augmentation to be rendered in response to the second pose of the mobile device with respect to the object in the environment.

30. The computer program product of claim 23 further comprising:
   instructions for tracking movement of the mobile device with respect to an origin of the environment; and
   instructions for determining the mobile device has moved with respect to the origin of the environment.

31. The computer program product of claim 30, wherein instructions for determining the mobile device has moved comprises at least one of:
   instructions for determining the mobile device has rotated more than a predetermined angle; and
   instructions for determining the mobile device has translated more than a predetermined distance.

32. The computer program product of claim 30, further comprising:
   instructions for identifying incremental map points captured by the mobile device in response to the movement of the mobile device;
   instructions for generating an updated simultaneous localization and mapping of the environment with the incremental map points captured by the mobile device; and
   instructions for sending the incremental map points captured by the mobile device in an updated search query to the server.

33. The computer program product of claim 32, wherein the updated simultaneous localization and mapping of the environment includes views of the environment larger than a field of view of the environment from the mobile device; and wherein the origin of the environment is out of the field of view of the mobile device.

34. An apparatus, comprising:
   means for receiving a plurality of images of an environment in view of a mobile device;
   means for generating a simultaneous localization and mapping of the environment using the plurality of images, wherein the simultaneous localization and mapping of the environment comprises a plurality of map points representing a plurality of surfaces in a three dimensional coordinate system of the environment;
   means for sending a set of the plurality of map points as a search query to a server at a first time instance;
   means for receiving a query response from the server at a second time instance; and
   means for identifying an object in the environment based at least in part on the query response, wherein the mobile device has a first pose relative to the object at the first time instance and the mobile device has a second pose relative to the object at the second time instance.

* * * * *